United States Patent Office 2,952,659
Patented Sept. 13, 1960

2,952,659

LINEAR POLYETHYLENE STABILIZED WITH ALKALI METAL SALTS

Charles R. Pfeifer, Midland, Mich., assignor to The Dow Chemical Company, Midland, Mich., a corporation of Delaware No Drawing. Filed Dec. 19, 1955, Ser. No. 553,729

10 Claims. (Cl. 260—45.7)

This invention relates to improved, non-corrosive compositions comprised of select corrosion-inhibiting agents and polymerized olefinic and other ethylenically unsaturated materials which have been prepared with certain catalytic metal compounds. In particular it relates to compositions of this nature which are not corrosive to metals and other materials of construction, particularly ferrous metals and alloys that do not have special corrosion-resisting properties and that are susceptible to attack from hydrogen halides and like corrodents, especially at elevated temperatures. The invention also relates to a method for preparing such compositions.

Various olefins and other ethylenically unsaturated materials, particularly ethylene, may be efficiently polymerized, even as relatively impure materials, to high molecular weight polymeric compounds at comparatively low pressures and temperatures, according to a process first proposed by Karl Ziegler and his associates in Germany. In this process, mixtures of strong reducing agents such as aluminum alkyls with compounds of group IV–B, V–B and VI–B metals of the periodic system including thorium and uranium are employed as catalysts for the polymerization. Polyethylenes, for example, having average apparent molecular weights (as indicated by measurement of such characteristics as their melt viscosities and the like) in excess of 40,000 and as large as 100,000 to 3,000,000 can be manufactured by polymerizing ethylene gas with such catalysts at temperatures beneath about 100° C. and under pressures less than about 100 atmospheres. It is frequently preferable when employing such catalysts according to the Ziegler process to operate at temperatures of about 50° C. and under pressures between about 1 and 10 atmospheres. The reaction may suitably be conducted in the presence of an organic liquid medium such as hexane, benzene, saturated petroleum hydrocarbon fractions and the like.

The polyethylenes prepared by the Ziegler process have superior and highly desirable properties. For example, they may be made containing less than 3 and even less than 0.03 methyl groups per each 100 methylene groups in the polymer molecule. The polymer molecules are practically completely linear and are crystalline almost to their melting points, which usually are in the neighborhood of about 125–135° C. Their densities are commonly in the range of about 0.94–0.96 gram per cubic centimeter and higher. They are insoluble in most solvents at ordinary temperatures. Shaped articles formed with such polyethylenes have tear strengths between about 1400 and 2800 pounds per square inch. Unstretched films prepared from them have tensile strengths in excess of about 2800 pounds per square inch and may be oriented by stretching to polyethylene film structures having tensile strengths as high as about 42,500 pounds per square inch.

The strong reducing agents which advantageously are employed in the catalyst mixtures of the Ziegler process include, among other compounds, a variety of aluminum trialkyls such as aluminum trimethyl, aluminum triethyl, aluminum tripropyl, aluminum triisobutyl and higher aluminum trialkyls as well as dialkyl aluminum halides, dialkyl aluminum hydrides and dialkyl aluminum alkoxides. Salts of metals selected from the group consisting of titanium, zirconium, uranium, thorium and chromium are preferably employed as the group IV–B, V–B and VI–B metallic compounds in the catalyst, although salts of the remaining metals in these sub-groups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in the catalyst.

A particularly active catalyst mixture for the Ziegler process may be obtained by mixing a titanium or zirconium compound, such as a tetrachloride, oxychloride or acetyl acetonate with an aluminum trialkyl or a dialkyl aluminum compound. Generally, the molar quantities of the aluminum alkyl employed to constitute the catalyst admixture are two to three times the valence of the group IV–B, V–B and VI–B metal compound for each mole of the latter compound which is present, although many other ratios may also be employed satisfactorily. Amounts of the catalyst admixture varying from 0.01 to a few percent by weight, depending on the degree of purity of the materials being polymerized, the desired rate of polymerization and the intended molecular weight, may suitably be employed.

After polymerization according to the Ziegler process, however, polyethylene and similar polymerized products contain residues from the admixed metallic catalyst employed. The residues are not sufficiently removed by the conventionally utilized aftertreatment of polymeric materials prepared according to the Ziegler process. Such aftertreatment usually involves filtration, preferably in the presence of air (which tends to lighten the color of the product), to separate the polymerization product from the reaction mass. This may be followed by sequential trituration with hexane, isopropanol, water, acetone and pentane prior to drying. When higher catalyst concentrations are employed in the Ziegler process, some of the metallic compounds may be removed from the polymeric product by extracting it with methanolic hydrochloric acid, then washing it in methanol or acetone. Butanol washings after the filtration in air have also been proposed to decompose and remove the catalyst residue.

It has been observed that the presence of certain catalyst residues in polymeric materials prepared according to the Ziegler process tends to impart decidedly undesirable characteristics to the polymers. For example, such polymers, particularly when the catalyst residue contains halogens, especially chlorine, which may cause the presence of hydrogen halides or like corrodents in the polymer, tend to be extremely corrosive to most of the materials of construction commonly utilized in apparatus for extruding, shaping or molding the polymer. This is greatly pronounced in the frequent cases when the construction materials employed in such apparatus are particularly sensitive or susceptible to attack from hydrogen halides in the presence or absence of moisture, particularly hydrogen chloride. Many of the frequently employed ferrous metals and alloys are susceptible to such corrosive attack, especially at elevated temperatures.

While various substances have been employed in other halogen-containing polymeric materials to diminish their corrosive propensities by countereffecting the presence of or acting as receptors for hydrogen halides and the like which may be present or formed in the polymer, many of these substances are not well suited for employment with polymeric materials, particularly polyethylene, prepared according to the Ziegler process. The reason for this is that a considerable proportion of the conventionally available substances tend to decompose or become ineffective at the relatively high temperatures which are beneficially employed for fabricating Ziegler type polymeric materials, particularly polyethylene. Fabricating temperatures in excess of about 200° C. and frequently as high as 300 to 350° C. have been found advantageous for fabricating such polymers as polyethylene prepared according to the Ziegler process in order to obtain optimum physical properties in the fabricated polymeric article. In addition, many of the conventional corrosion-inhibiting substances tend to be toxic. This further lessens the desirability of their being employed in articles intended for association with foodstuffs such as films, containers, cartons and the like.

It would be advantageous, therefore, to provide compositions prepared with halogen-containing catalyst admixtures according to the Ziegler process and containing halogens in the catalyst residue which would be non-corrosive to materials that are susceptible to attack from hydrogen halides and like corrodents. It would be additionally advantageous if such compositions were non-corrosive in such a manner at elevated fabricating temperatures. It would be especially advantageous if, besides being non-corrosive, many such compositions were non-toxic and adapted for employment in articles intended for association with food-stuffs or in other applications wherein appreciable toxicity could not be tolerated.

These and other advantages and benefits may be realized according to the compositions provided by the present invention which are comprised of a polymerized olefinic and other ethylenically unsaturated material, particularly polyethylene, prepared with halogen-containing catalysts according to the herein described Ziegler process and containing halogen-including residues from the catalyst which tend to cause the presence of a hydrogen halide, particularly hydrogen chloride, or like corrodent in the polymerized substance and a corrosion-inhibiting quantity of a compound, selected from the group of alkali metal salts of acids and amphoteric bases consisting of alkali metal salts of orthoarsenic acid; alkali metal salts of arsenious acid; alkali metal salts of boric acid; and alkali metal salts of aluminum hydroxide, which has a receptor function for and is capable of countereffecting hydrogen halide and like corrodents. Generally the compound may advantageously be employed in the composition in an amount between about 0.005 and 5 percent by weight, based on the weight of the composition. Frequently, in order to satisfactorily inhibit the corrosive nature of many of the polymeric materials prepared according to the Ziegler process, an amount between about 0.5 and 2.0 percent by weight, based on the weight of the composition may be utilized. In all cases the relative amount of the compound which will suitably inhibit corrosion can be predicted on the relative proportion of the halogen-including catalyst residue which remains in the polymer product and the degree of its tendency to cause the presence of a corrodent therein. Consideration of these factors under the influence of elevated temperatures must also be involved whenever fabrication of the corrosion-inhibited polymer at such temperatures is contemplated.

Compositions according to the present invention show little or no tendency to corrode or cause chemical attack upon apparatus which may be employed for their fabrication, even when such apparatus is constructed from such materials as mild steel and other frequently utilized ferrous metals and alloys having poor resistance to corrosion from hydrogen halides; particularly hydrogen chloride, and like corrodents. The inhibition of corrosion of the apparatus is also advantageously obtained during fabrications at elevated temperatures. The compositions do not necessitate employing fabricating apparatus which is made from relatively more expensive materials of construction which have special corrosion-resisting characteristics and eliminate the expensive damage and waste which occurs when conventional apparatus is corroded. In addition, better quality products may be obtained when the fabricating apparatus is kept free from the physical damage caused by corrosion. Furthermore, a large proportion of the compositions are non-toxic and may be employed safely with foodstuffs. In addition, many of the corrosion-inhibitors according to the present invention enhance certain other of the properties of the compositions as, for example, appearance, which may frequently be benefited by incorporation of a corrosion-inhibitor having an ancillary pigmentation effect. Also, the great majority of the compositions of the present invention are tolerant of the presence of other conventional additament materials which may be employed if required for such various purposes as to stabilize the composition against the effects of heat or light or oxygen or to impart color or to attain other specific and desirable benefits.

Compounds selected from the group consisting of the alkali metal salts of orthoarsenic acid; arsenious acid; boric acid and aluminum hydroxide may advantageously be employed as corrosion-inhibitors in compositions according to the present invention with particular advantages being derivable when the alkali metals are sodium and potassium. Greater advantages may frequently accrue when such specific compounds as sodium aluminate, sodium arsenate and sodium tetraborate are employed.

In a series of illustrative examples, various corrosion-inhibiting compounds were incorporated in a relatively high molecular weight polyethylene which was prepared with an admixed aluminum alkyl-titanium tetrachloride catalyst according to the herein described Ziegler process and contained between about 0.02 and 0.08 percent by weight based on the weight of the polyethylene, of chlorine in the catalyst residue. In each of the tests a small plate of mild steel (1" x 1" x 1/8") having a finished surface was imbedded under compression molding within a particular polyethylene sample in order to form a steel-in-polymer matrix. Each of the test matrices was then maintained at a temperature of about 250° C. for about twelve hours after which it was cooled and stripped of the polymer. Each of the test plates was permitted to remain overnight in air before being examined. The test plates were then inspected for evidences of corrosion. The following table reproduces the results obtained with several corrosion-inhibiting compounds.

| Compound | Percent by wt. in polyethylene composition | Evidence of Corrosion |
| --- | --- | --- |
| Corrosion-inhibitor: | | |
| None | | Severe. |
| Sodium aluminate | 2.0 | None. |
| Sodium arsenate | 2.0 | None. |
| Sodium tetraborate | 2.0 | None. |

Similar excellent results may be obtained with such corrosion-inhibiting additament materials as lithium tetraborate, lithium aluminate, lithium arsenate, sodium metaborate, sodium arsenite and potassium arsenite.

The corrosion-inhibiting compounds may be incorporated in compositions according to the present invention in various suitable ways including dry-blending the ingredients; mixing the ingredients on compounding rolls and the like; and dispersing the corrosion inhibiting compound from liquid dispersion onto the polymer particles followed by evaporation of the liquid.

Since certain changes and modifications in the practice of the present invention can be entered into readily without departing substantially from its intended spirit and scope, it is to be fully understood that all of the foregoing description and specification be interpreted as merely being descriptive of certain of its preferred embodi-

What is claimed is:

1. A non-corrosive composition comprising polyethylene prepared by polymerizing ethylene in the presence of a halogen-containing catalyst formed by admixing an aluminum alkyl with a titanium halide, said polyethylene containing halogen-including catalyst residues after having been polymerized which cause the presence of hydrogen halide in the polymerized material, and between about 0.005 and 5 percent by weight of a corrosion-inhibiting compound which has a receptor function for and is capable of counter-effecting hydrogen halide; said corrosion-inhibiting compound being selected from the group consisting of sodium arsenate, sodium arsenite, sodium metaborate, sodium tetraborate, sodium aluminate, lithium tetraborate, lithium aluminate, lithium arsenate, and potassium arsensite.

2. The composition of claim 1 containing between about 0.5 and 2.0 percent by weight of the corrosion-inhibiting compound.

3. The composition of claim 1 wherein the corrosion inhibitor is sodium arsenate.

4. The composition of claim 1 wherein the corrosion inhibitor is sodium tetraborate.

5. The composition of claim 1 wherein the corrosion inhibitor is sodium aluminate.

6. The composition of claim 1 wherein the polyethylene is prepared by polymerizing ethylene in the presence of a catalyst formed by admixing an aluminum alkyl with titanium tetrachloride.

7. The composition of claim 1 characterized in being non-corrosive to materials susceptible to attack from hydrogen halides at temperatures up to about 350° C.

8. The composition of claim 1 characterized in being non-corrosive to mild steel at fabricating temperatures for the composition.

9. A non-corrosive composition comprising polyethylene prepared by polymerizing ethylene in the presence of a halogen-containing catalyst formed by admixing (1) an aluminum alkyl and (2) a compound selected from the group consisting of halogenides, oxyhalogenides, complex halogenides, freshly precipitated oxides, freshly precipitated hydroxides, alcoholates, acetates, benzoates, and acetyl acetonates of a metal selected from the group consisting of titanium, zirconium, uranium, thorium, and chromium, said polyethylene containing halogen-including catalyst residues after having been polymerized which cause the presence of hydrogen halide in the polymerized material, and, as a corrosion inhibitor, between about 0.005 and 5 percent by weight of a compound which has a receptor function for and is capable of counter-effecting hydrogen halide, said corrosion inhibitor being selected from the group consisting of sodium arsenate, sodium arsenite, sodium metaborate, sodium tetraborate, sodium aluminate, lithium tetraborate, lithium aluminate, lithium arsenate, and potassium arsenite.

10. The composition of claim 9 containing between about 0.5 and 2.0 percent by weight of the compound.

References Cited in the file of this patent

UNITED STATES PATENTS

| | | |
|---|---|---|
| 2,218,645 | Japs | Oct. 22, 1940 |
| 2,364,410 | Whittaker | Dec. 5, 1944 |
| 2,387,571 | Fikentscher et al. | Oct. 23, 1945 |
| 2,507,142 | Chaban | May 9, 1950 |
| 2,734,892 | Carter | Feb. 14, 1956 |
| 2,838,477 | Roelen et al. | June 10, 1958 |
| 2,843,577 | Freidlander et al. | July 15, 1958 |

FOREIGN PATENTS

| | | |
|---|---|---|
| 533,362 | Belgium | May 16, 1955 |

OTHER REFERENCES

Pauling: General Chemistry, copyright 1947, published by W. H. Freeman & Co.; inside cover.

Partington: Text-Book of Inorganic Chemistry, reprinted 1953, pub. MacMillan & Co., London; pages 367 and 368.